United States Patent

[11] 3,572,449

| [72] | Inventors | Alexander Norman Brocas<br>Mount Roskill, Auckland;<br>Arthur John Wildy, Mount Wellington,<br>Auckland, New Zealand |
|---|---|---|
| [21] | Appl. No. | 779,347 |
| [22] | Filed | Nov. 27, 1968 |
| [45] | Patented | Mar. 30, 1971 |
| [73] | Assignee | said Wildy assor to Mason & Porter<br>Limited<br>Mount Wellington, Auckland, New Zealand |
| [32] | Priority | Nov. 29, 1967 |
| [33] | | New Zealand |
| [31] | | 150,871 |

[54] MACHINES FOR BORING HOLES
16 Claims, 18 Drawing Figs.

[52] U.S. Cl............................................. 175/57
[51] Int. Cl............................................. E21b 7/00
[50] Field of Search......................................... 175/57,
113, 162, 173, 202, 203, 313, 316, 323, 394

[56] References Cited
UNITED STATES PATENTS

| 1,604,896 | 10/1926 | Foltz | 175/113 |
|---|---|---|---|
| 2,250,670 | 7/1941 | Joy | 175/173 |
| 2,250,671 | 7/1941 | Joy | 175/173 |
| 2,886,288 | 5/1959 | Gehrke | 175/173 |
| 3,104,563 | 9/1963 | Gulley | 175/173X |
| 3,407,888 | 10/1968 | Graipin | 175/173 |

*Primary Examiner*—Nile C. Byers, Jr.
*Attorney*—Holman & Stern

ABSTRACT: The boring of holes in which a machine provided with a rotatable cutter and a rotatable clearing device is manipulated so that the clearing device is rotated in a direction opposite to the direction of the cutter with the clearing device following the cutter into a hole formed by the cutter. The torque reaction of the cutter is balanced against the torque reaction of the clearing device whereby under normal operating conditions little controlling moment need be applied for holding the machine during boring.

FIG. 1

Patented March 30, 1971

Patented March 30, 1971 3,572,449

MACHINES FOR BORING HOLES

This invention relates to methods of and/or apparatus for boring holes.

At present, conventional boring machines comprise an auger rotatably mounted in a frame, the frame also carrying the motor which drives the auger through a suitable transmission, the auger, usually of helical form, having its forward edges sharpened to act as a cutter. The disadvantages of such a machine are that the auger does not always properly clear the hole being made particularly when the machine is used for boring earth and furthermore, the cuttings sometimes come away in a continuous peeling and this tends to clog the auger, thus frequently the machine must be drawn from the hole to clear the cuttings and this is laborious and time consuming. Also should earth conditions cause this peeling to be thick the machine may "corkscrew" into the ground without digging and be very hard to extricate. Furthermore, the action of cutting the peeling and that of transporting it to the surface create torque reactions in the same sense the sum of which must be resisted by the operator and this requires considerable strength. This singularity of effect also makes the machines somewhat dangerous since should the cutter strike an obstruction such as a rock or tree root or should the transporting helix jam with spoil, then the tendency is for the frame and in some instances the operator holding the frame to be thrown around suddenly and this is dangerous in open spaces but much more so in confined spaces for example at the bottom of a ditch where a horizontal hole is being cut beneath a roadway.

It is therefore an object of the present invention to provide method of and/or apparatus for boring holes which will obviate or minimize the foregoing disadvantages in a simple yet effective way or which will at least provide the public with a useful choice.

Accordingly in one aspect the invention consists in a method of boring holes using a machine having a cutter and a clearing device said method comprising the steps of rotating said cutter against a surface to be bored, rotating said clearing device in the opposite direction to the direction of rotation of the cutter, the clearing device following the cutter into a hole formed by the latter and balancing the torque reaction of cutting against the torque reaction of the clearing device so that under normal operating conditions little controlling moment need be applied in holding the machine during boring.

In a further aspect the invention consists in apparatus for boring holes comprising a frame, a rotatable cutter, a shaft mounting said cutter so as to be rotatable relative to said frame, a rotatable cuttings clearing device journaled on said shaft, a power source mounted on said frame power transmission means connecting said power source to said cutter and to said clearing device so as to drive them in opposite directions, said cutter and said clearing device being constructed so that on a hole being made by the cutter the torque reaction of the cutter is substantially balanced by the torque reaction of the clearing device in clearing cuttings by rubbing them against the cylindrical wall of the hole so that under normal operating conditions little holding moment need be applied in holding the apparatus during boring.

In a still further aspect the invention consists in boring apparatus comprising a frame, a rotatable cutter, a shaft mounting said cutter so as to be rotatable relative to said frame, a rotatable screw conveyor journaled on said shaft, a power source mounted on said frame, power transmission means mounted on said frame connecting said power source to said rotatable cutter and to said rotatable screw conveyor so that the torque of the one is balanced through said power transmission means against the torque of the other so that when both said cutter and said conveyor are rotated in opposite directions said frame is substantially free of torque, and manually operable control means connected to said power transmission means and operable by an operator selectively to control rotation of said cutter and said conveyor so that either or both may rotate according to the selection made by the operator.

In a still further aspect the invention consists in a machine for boring holes comprising a frame, a cuttings clearing device rotatably mounted in said frame, a cutter rotatably concentrically mounted on the end of said cuttings clearing device remote from said frame, a source of power mounted on said frame, a transmission means driven by said source of power adapted to rotate said clearing device and said cutter in opposite directions, handle means operable by an operator to control the machine in operation, the torque reaction from said cutter being substantially balanced in use against the torque reaction of said clearing device in clearing cuttings made by the cutter in boring a hole and the torque reaction created by friction of said clearing device rubbing itself or cuttings against the walls of said hole.

Embodiments of the invention will now be described with reference to the accompanying drawings in which.

Figure 1:
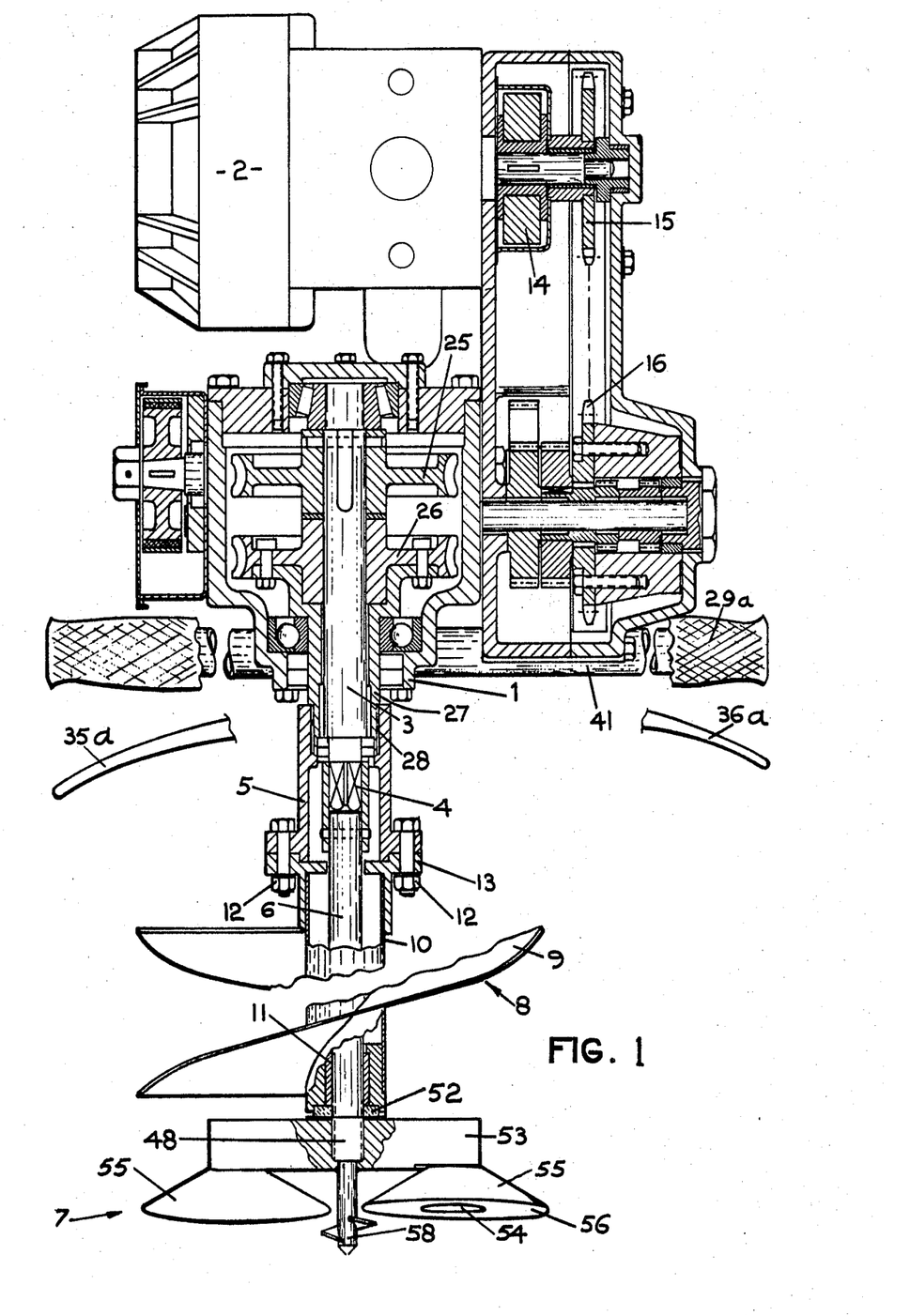
FIG. 1 is a Plan of one form of boring machine according to the invention shown partly in section.

Referring to FIGS. 1 to 4 of the drawings an earth boring machine which has been designed for use in boring holes in the earth, e.g., post holes or ducts for cables and so on comprises a main frame or casing 1 on which is mounted a driving motor 2 which may be a gasoline motor as illustrated or may be an electric or compressed fluid motor if desired. A transmission is provided between the motor and two rotatable members, a rotatable shaft 3 having a squared end 4 and a rotatable flanged member 5. The shaft 3 drives a further shaft 6 which in turn drives a cutter 7 and the flanged member 5 drives a cuttings clearing device 8 which comprises a helical member 9 fixed to a tube 10. The tube 10 carries a bearing 11 in which the shaft 6 rotates and the clearing device 8 is bolted to the flanged member 5 with bolts 12 passing through a corresponding flange 13 on the device 8. In FIG. 1 the device 8 is shown broken but may be of any convenient length, for example, 3 feet.

The cutter 7 and the device 8 are rotated in opposite directions by the transmission which will now be described.

Figure 2:
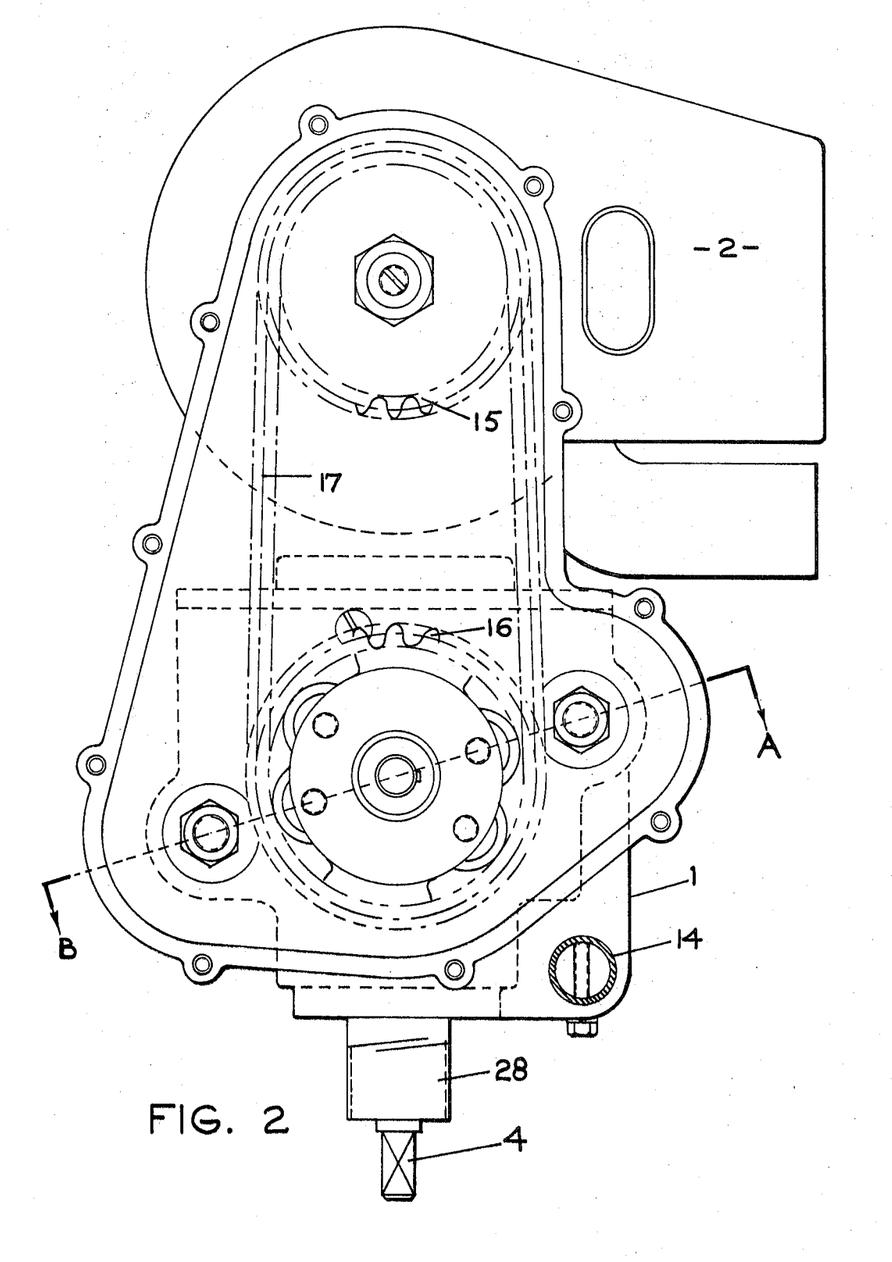
FIG. 2 is a right side view of the machine shown in FIG. 1 with a transmission cover removed.
Figure 3:
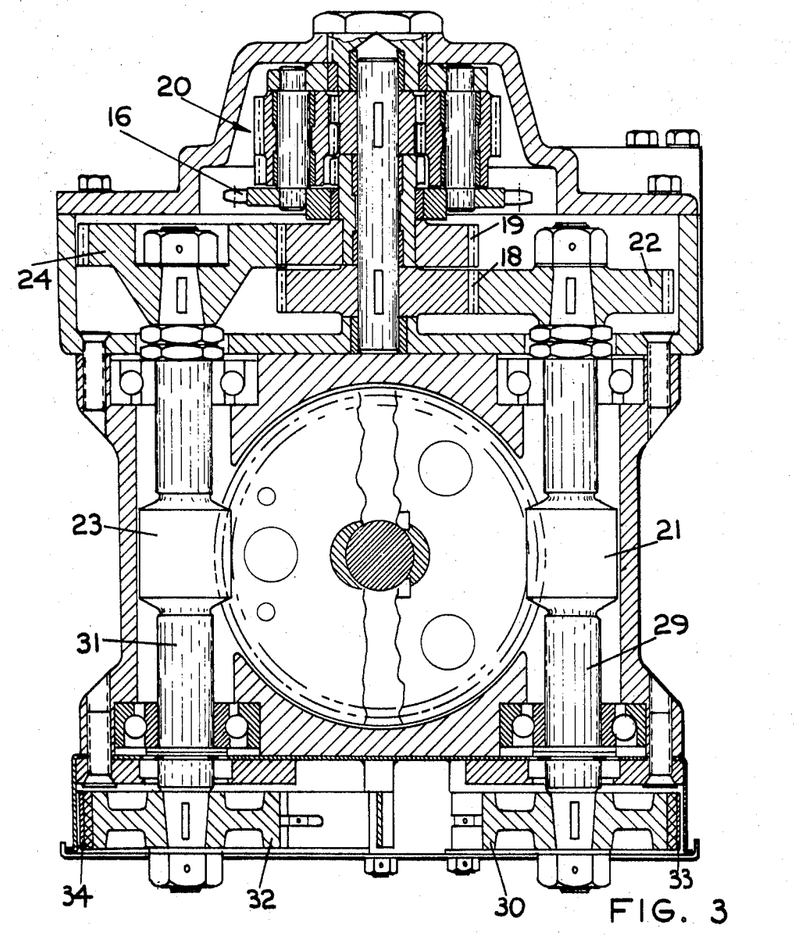
FIG. 3 is a section on the line A-B FIG. 2.
Figure 4:
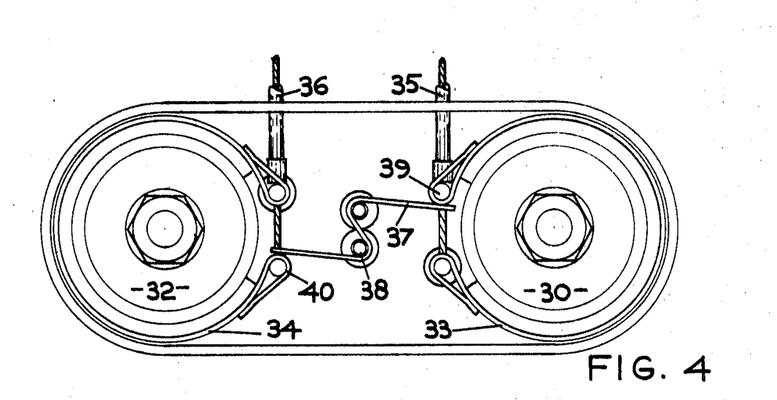
FIG. 4 is a left side view of a brake assembly shown in section in FIG. 3, with the cover removed.

The motor 2 is provided with a centrifugal clutch 14 and drives a sprocket wheel 15 which in turn drives a driven sprocket wheel 16 through a roller chain 17 shown in outline only in FIG. 2. Referring to FIG. 3 it will be seen that the sprocket wheel 16 drives two gearwheels 18 and 19 through a differential gearing 20. The gear 18 drives a worm 21 through a further gear 22 and the gear 19 drives a worm 23 through a further gear 24. The worm 21 drives a cutter driving worm wheel 25 (FIG. 1) keyed to the shaft 3 and the worm wheel 23 drives a further worm wheel 26 bolted to a hollow spindle 27 on which the flanged member 5 is screwed at 28, the thread being appropriate to the direction of drive of the clearing member 8. Mounted on the end of the shaft 29 carrying the worm wheel 21 is a brake wheel 30 and mounted on the end of the shaft 21 carrying the worm 23 is a brake wheel 32, these brake wheels being keyed to the respective shafts. Brake bands 33 and 34 coact with the brake wheels 30 and 32 respectively and a Bowden wire 35 is mounted to operate the brake band 33. A Bowden wire 36 is provided to operate the brake band 34. A spring 37 is mounted on pegs 38 and bears against the moving end 39 of the brake band 33 and the moving end 40 of the brake band 34 to keep these brake bands free of the brake wheels when the Bowden cables are released. The Bowden cables are connected to motorcycle-type brake levers 35a and 36a fitted one on each end of the handle bar 41 (FIG. 1). The handle bar 41 is fixed to the casing 1 and is extended in any convenient manner and carries the levers 35a and 36a (shown diagrammatically in FIG. 1) near the end thereof and also carries a twist grip throttle control 29a for the motor 2. The details are not shown in the drawings. Details of the differential bearing mountings and other features of the casings will not be described as these will vary from model to model and are obvious to those skilled in the art.

Figure 5:
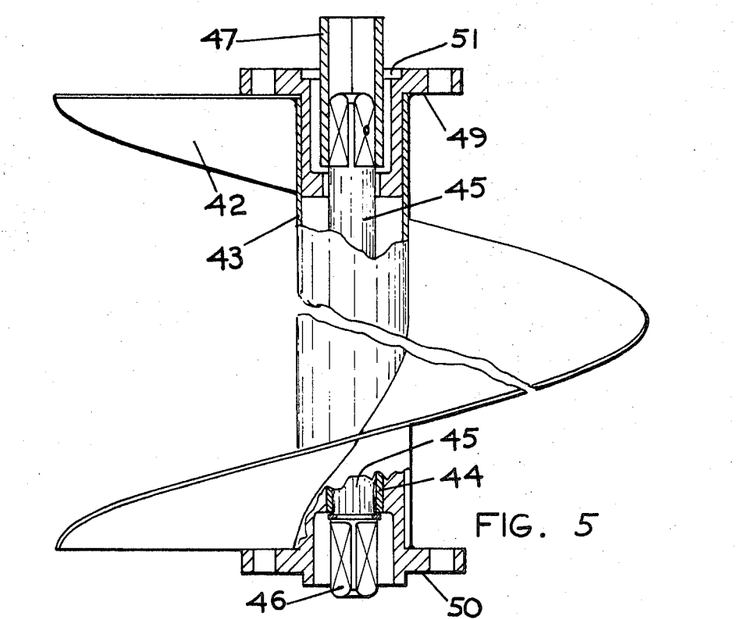
FIG. 5 is a side elevation of a shaft and helix extension so that the device may be used for drilling deeper holes.

Since it may be desired to extend the depth to which the machine may bore extension sections illustrated in FIG. 5 are provided. These extension sections comprise an extension helix 42 mounted on a tube 43 the tube carrying a bearing 44 at one end and a shaft 45 runs in this bearing the shaft having a squared end 46 to receive either socket 47 of a previous extension or that of the basic section already in the bore and having a squared coupling 47 into which the squared end of a later extension or the squared end of 48 of the shaft 6 fits. The tube 43 carries a flanged bush 49 which fits on a suitable flanged bush such as the bush 50 at one end of an extension or a similar bush fixed to the tube 10 of the clearing member 8 as shown in FIG. 1. It will be noted that the bush 49 carries an annular depression 51 which provides concentricity by mating with the spigots, provided on flanges 5 or 50. There are of course practical limits to the number of extension sections which can be fitted depending on the condition of material in which boring is to be effected and the power available from the motor or motors. When drilling holes extensions are added between those already in the bore and the driving assembly outside it.

Figure 6:
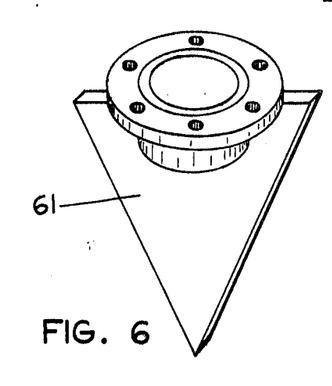
FIGS. 6 to 8 illustrate different types of cutters for cutting different materials.

Cutters of various types may be used, for example, the cutter 7 shown mounted in FIG. 1. In this cutter a rotating head 53 has two pivots 54 mounted thereon on which are held captive rotating knife wheels 55, these wheels being frusta of cones and of course being of a material of suitable strength and hardness. The pivots 54 are mounted at an angle such that the front faces 56 of the cutters have clearance from the surface which is being cut and that their outer peripheries contribute to the cutting thrust by running on a helical path along the wall of the bore. In this construction a pilot auger 58 is provided. However a gimlet-type pilot auger 61 FIG. 6 may be used.

Figure 7:
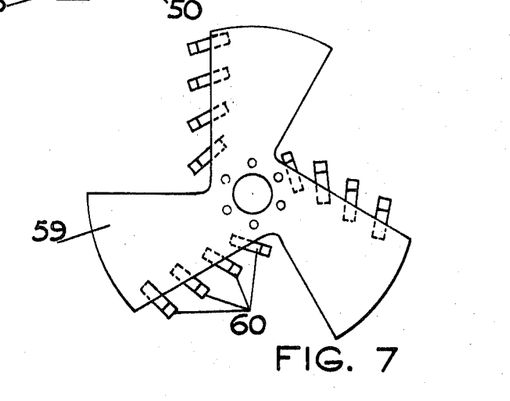

In an alternative construction shown in FIG. 7 a base plate 59 carries a series of circumferentially placed teeth 60 these teeth having appropriate side and face clearances and appropriate shapes to enable a reasonable cutting action to be attained in harder material such as scoria.

Figure 8:
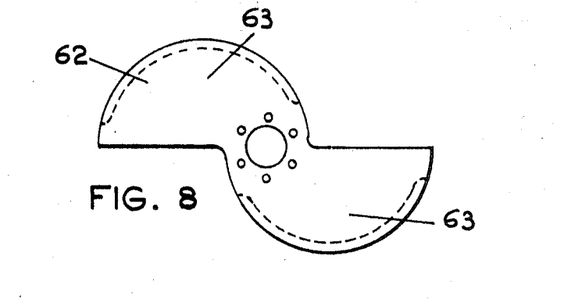

In FIG. 8 a still further construction is shown in which a base plate 62 carries radial blades 63 having curved beveled cutting edges. The blades may be twisted to give clearance of the blades from the face being cut.

The use of the above construction is as follows. The operator starts the motor and because of the centrifugal clutch the chain wheel 15 will not yet rotate. The user then applies the cutter 7 to the earth at the point where cutting is to commence and speeds up the motor 2 by operating the twist grip throttle control 29a referred to above. As a result the centrifugal clutch will operate to cause the chain wheel 15 to be driven and as a result the chain wheel 16 is also driven. The effect of the differential 20 is such that the rotation of the cutter 7 and the device 8 will now be dependent on the load on the members. If, for example, the cutter 7 is pressed against the earth this will probably effectively stop that cutter and consequently the device 8 will be rotated since there is no hole as yet and no material to be cleared. Accordingly the operator operates the Bowden cable 36 by operating lever 36a so that the brake band 34 brakes the brake wheel 32 and consequently the worm 23 and the worm wheel 26 driving the device 8. As a result of this braking the differential will operate to cause the cutter only to be driven and as a result cutting of a hole will commence. It is to be noted that with the cutter shown in FIG. 1 and 7 the cutter will rotate anticlockwise.

Once the cutter has opened up a hole to a stage where part of the helix 8 has entered the hole the operator may then release the hand lever 36a and as a result the helix will also now rotate but in the opposite direction to the direction of the cutter i.e. clockwise. The actual speeds of rotation with the constructions shown are designed so that the speeds are equal when the differential is not operating. However, the actual speeds of the cutter and the clearing device will depend on the torque reactions each of these will utilize in operation. The power needed for the cutter and for the clearing device are substantially balanced, the torque reaction of the cutter being balanced against the torque reaction of the work done in the device 8 clearing cuttings and the friction of the edges of the helix 9 against the wall of the hole being dug, the diameters of the helix and the cutter being preferably the same. In general, we have found that the operator needs to exert little control moment over the machine but under certain conditions, for example when hitting a hard spot in driving it may be necessary to stop the device 8 thus allowing cutting only to continue and, of course, such cutting continues at a rate up to twice the rate at which the rotation takes effect when normal cutting and clearing are operating. Furthermore should the operator wish to clear the hole, for example immediately prior to withdrawing the machine from the hole or because the propulsive effect of too full a helix becomes excessive he may stop the cutting action by operating the lever 35a which operates the Bowden cable 35 and thus brakes the brake wheel 30 and consequently the cutter worm wheel 25.

It is a particular feature of the invention that when normal cutting is in operation and the cutter 7 and the device 8 are rotating steadily with the differential action freely operating there is little or no torque on the handle bar 41 so that operator need only provide such forward pressure as may be required and does not need to provide a contra torque to control the action of the machine. Furthermore even if a hard piece of ground is encountered or an obstruction such as a rock or a root the differential action prevents there being a sudden material change in torque reaction on the handle bars. However, when the operator is braking one or other of the braking wheels 30 or 32 a torque reaction on the handle bar 41 will be experienced but under these circumstances the operator has himself induced this and can act accordingly. Therefore, there is little possibility of the operator being taken by surprise by an unexpected torque reaction and this leads to easy and safe operation of the machine. Furthermore because of the contrarotating action of the cutter 7 and the device 8 rapid and effective clearing of the spoil from the hole being bored is effected. Under normal circumstances the device 8 will keep pace with cuttings being cleared being cut from the hole being made. However, even if this is not the position, because of the control the operator has over the cutting and clearing actions he may appropriately operate his controls to achieve adequate removal of spoil at any time thus resulting in a particularly clean hole necessitating little or no hand finishing, for example of a post hole after it has been dug to a suitable depth or to delay the clearance of spoil thereby obtaining additional thrust against the cutting face. The machine may be used for boring horizontal holes or holes inclined to the horizontal or vertical holes as desired. It is a further advantage of the construction that the spoil or cuttings will not come out of the bore in a continuous helical shaving which may lead to some difficulties but in the form of smaller pieces which have been broken from the shaving coming from the cutter as a result of the contrarotating action of the cutter 7 and device 8. Thus the particular points of the above construction may be put as follows. The advantages are.

1. To obviate or substantially reduce according to the drive system selected the torque reaction on the operator by virtue of the counter rotation of the cutter and clearing device.
2. The machine permits the operator at will to override the balanced torque reaction when it is desired to operate one only of the functions of cutting and clearing enabling considerable degree of control to be exercised when operating the machine.
3. The machine has the advantage of preventing corkscrewing due to the chip-breaking effect of the speed difference between the cutter and clearing device.
4. A rate of progression in proportion to the substance of the soil may be achieved by using the load friction of the clearing device on the bore walls as the reactive medium against which the cutter is driven into the material.
5. Straightness of a bore is maintained by the cutting device accurately fitting the bore, i.e. the cutter diameter and the helix diameter are substantially the same.
6. By providing totally independent controllability of the cutter and of the clearing device it is possible to regulate with accuracy the rate of progression and the loading of the machine and to be able to clear the bore readily on completion.

Figure 12:
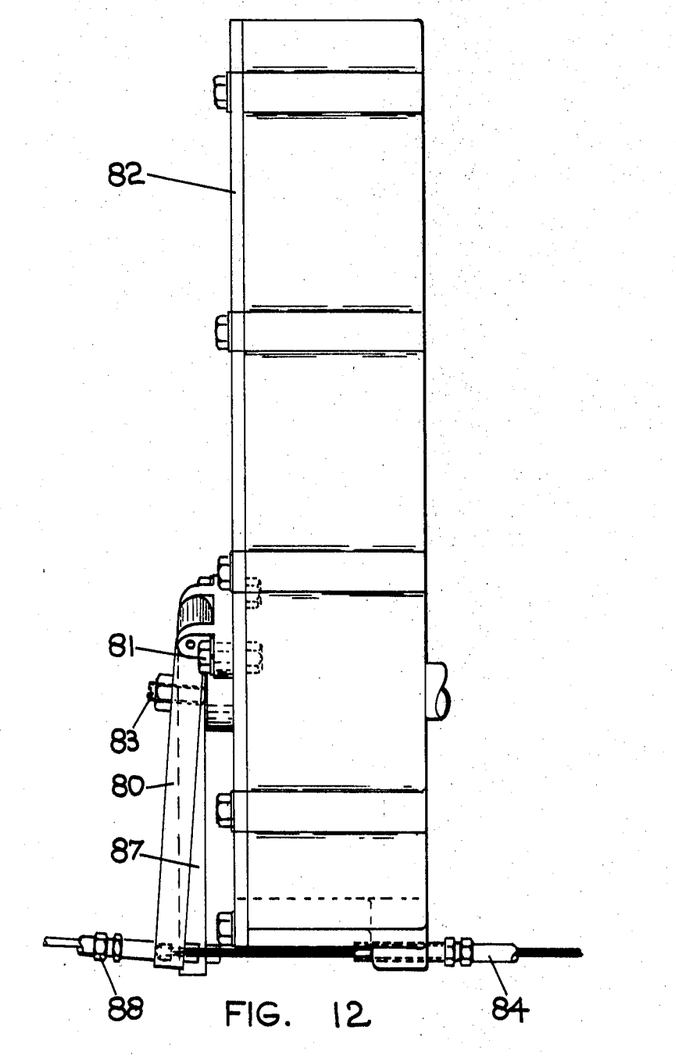
FIG. 12 is a side elevation of the construction shown in FIG. 9 but with the cover in place.

The foregoing describes a construction in which there is gear and chain driving of the worms 21 and 23 and in which control of the speed of rotation of the cutter and clearing device is effected by providing a differential gear and braking means. An alternative construction is, however, possible using either roller chains or clutches or if desired a belt drive and belt clutch arrangement such as that illustrated in FIGS. 9 to 12. In these figures a motor similar to the motor 2 drives two V-belt pulleys 71 and 72. The pulleys 71 and 72 drive sheaves 73 and 74 respectively each of these sheaves having a fixed driving face 75 and a moving driving face 76 the moving driving faces being driven by pins 77 slidable in one wall of the sheaves 73 and 74. To enable the walls carrying the movable driving walls carrying the faces 76 to be moved by an operator the face 76 on the pulley 73 have an integral bush 79, the bush having a cap 80a and referring to FIG. 12 a lever 80 is pivoted at 81 to a part 82 of the casing of the machine and the lever 80 carries an adjustable pin 83 which bears on and moves the cap 80a and consequently moves the face 76 towards the face 75 of the sheave 73 under the control of an operator through a Bowden cable 84. Similarly on sheave 74 the flange 76 carries an integral bush 85 having a cap 86 and a lever 87 is operated by a further Bowden cable 88 to move the flange 76 towards the fixed face 75 of the sheave 74. The pulleys 73 and 74 drive shafts equivalent to shafts 29 and 31 shown in FIG. 3 so that in effect this construction from worms 21 and 23 are continued in the same way as is shown and as described above with reference to FIGS. 1 to 3. However, there are some slight differences in that because the gears 22 and 24 are omitted the engine is required to run in the opposite direction to give the same directions of rotation of the cutter and clearing device and it is also necessary to reverse the worm shafts end for end to obtain a face for oil seals necessary or alternatively the belt drives may be mounted where the discarded brake apparatus is removed and the engine turned about to suit. Also the adjustable ends of the worm shafts are capped as there is no requirement for the braking system shown more particularly in FIG. 4 above described. Furthermore the controls are not brakes to brake the system but clutches enabling one or both of the constructions to be driven at will. In this construction the balancing of the torque reactions on the cutter 7 and clearing device 8 is obtained by the features inherent in the invention that the cutting torque reaction substantially balances against the torque reaction from the device 8 clearing the tailings and secondly the edges of the device 8 rubbing against the walls being made. Surprisingly the depth of hole does not materially alter this relationship and when an obstruction is met, this is usually asymmetrical so that the cutter tends to try and rotate (or be fixed) eccentrically to the hole and this has the effect of greatly increasing the load resulting from engagement of the helix on the wall —in effect the device 8 endeavors to become a cutter attempting to cut one side of the hole. The resultant effect is more to tend to stall the motor than to give a rotating kick against the handle bar 41. Thus this machine also is a docile one to use.

The operation will be clear. The operator starts the motor and by placing the cutter on the ground and operating the clutch which drives the cutter so that that cutter is driven he may commence digging and may then operate the other clutch to cause the clearing device to be driven also and by appropriately controlling these clutches he will achieve a satisfactory cutting action.

Figure 9:
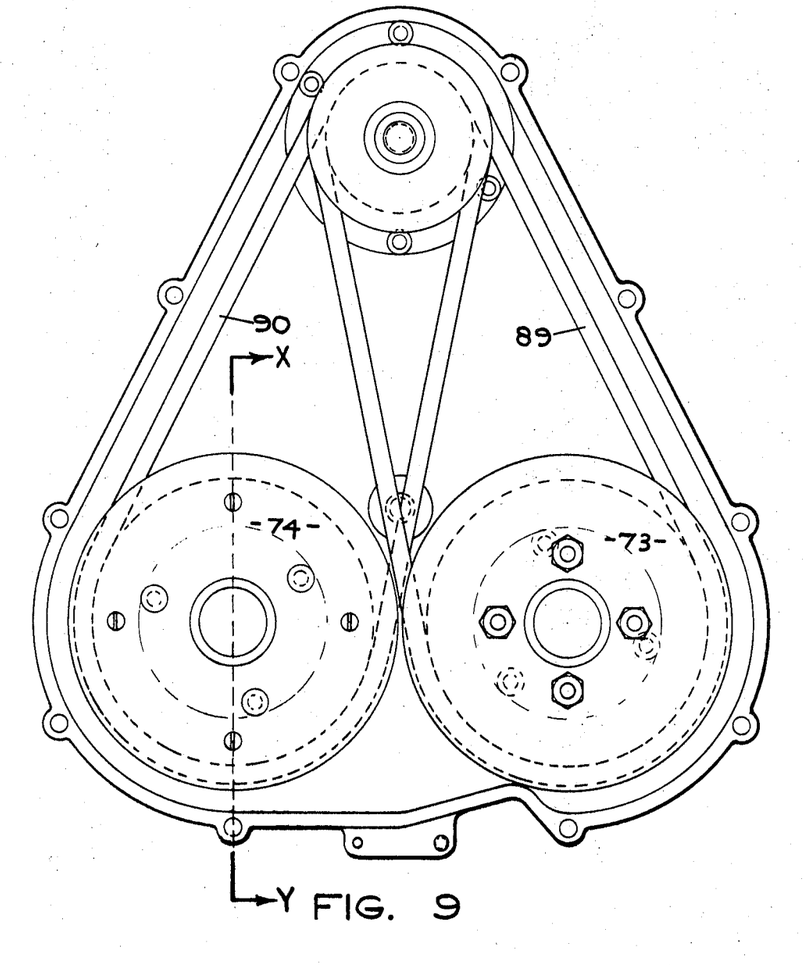
FIG. 9 is a plan view of an alternative belt drive transmission with the cover removed.
Figure 10:
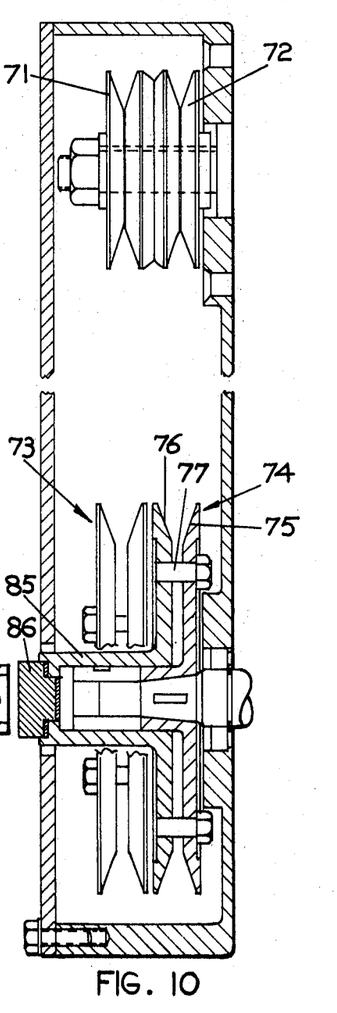
FIG. 10 is a section on X-Y of FIG. 9.
Figure 11:
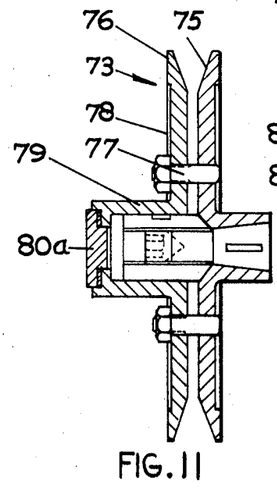
FIG. 11 is a section on the line of the other clutch pulley shown in FIG. 9.

The operation of the clutches will of course operate to move the movable driving face of the sheaves 73 and 74 towards the fixed driving faces of the sheaves and thus to cause frictional engagement with the belts 89 and 90 so that driving is effected.

Figure 13:
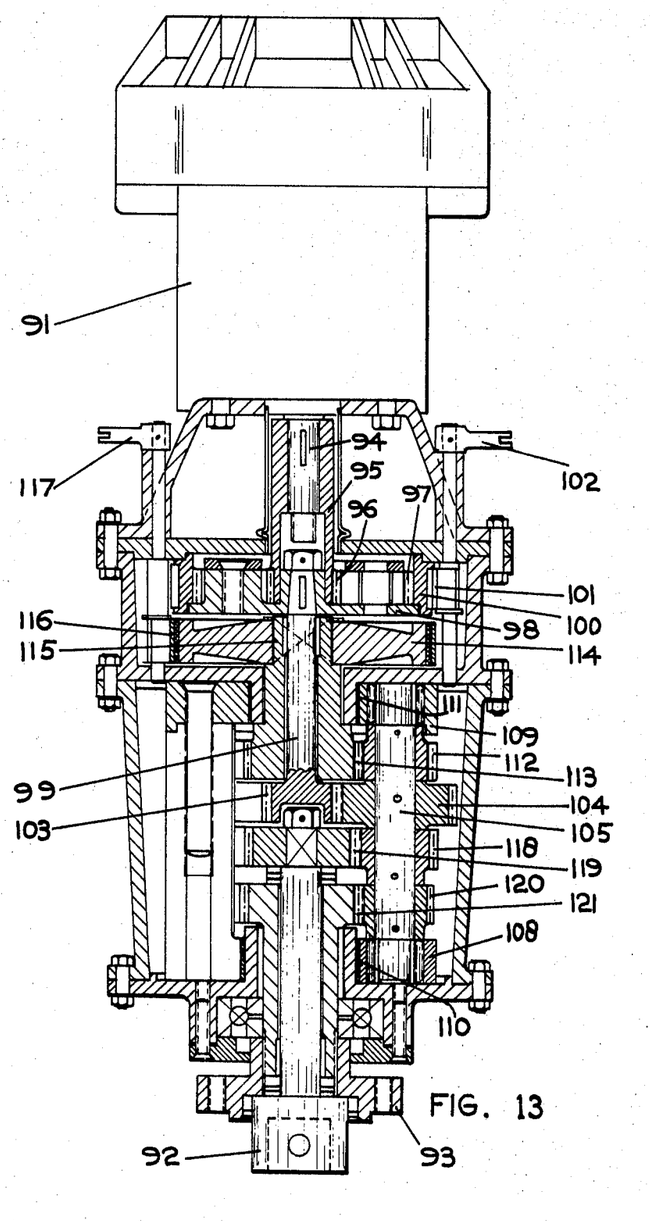
FIG. 13 is a side elevation partly in section showing a further embodiment of the invention utilizing a differentiating compound epicyclic reduction drive.
Figure 14:
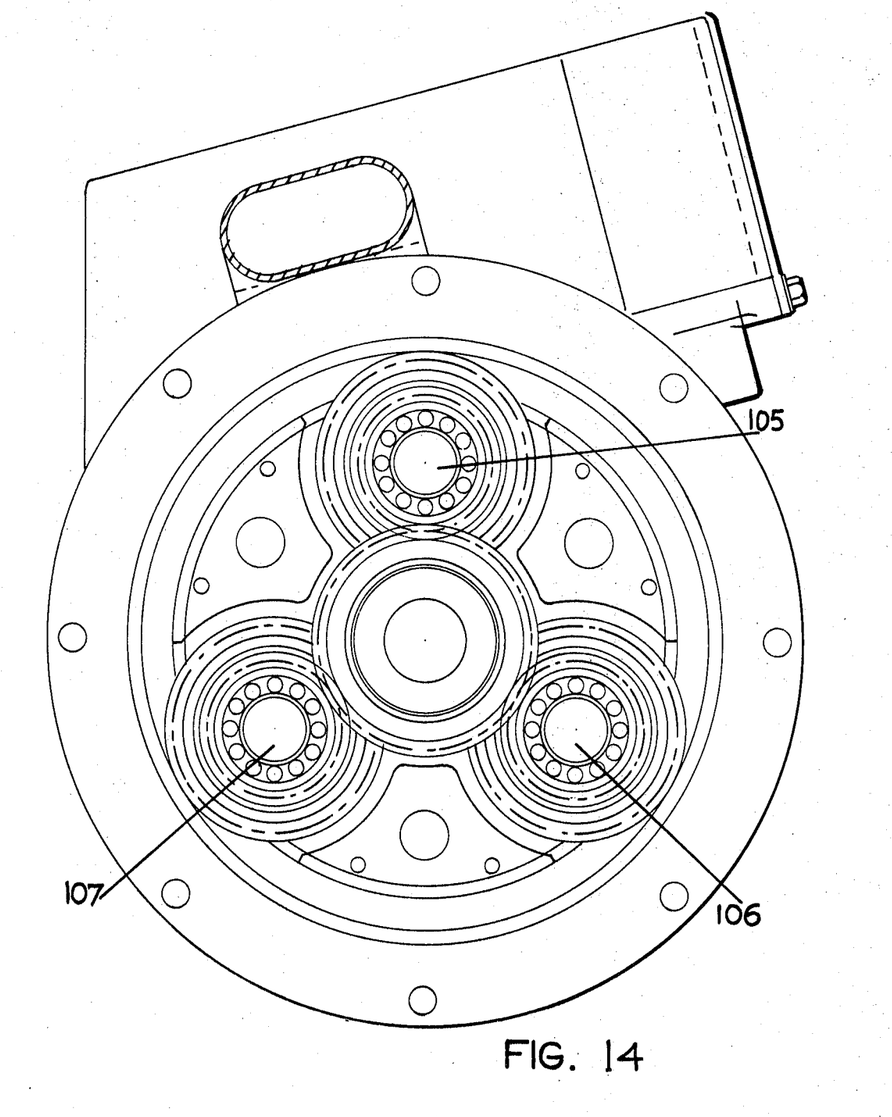
FIG. 14 is a diagrammatic end view of the construction in FIG. 13.

A still further embodiment of the invention is shown in FIGS. 13 and 14 in which the transmission between a motor 91 and a cutter drive 92 and clearing device drive 93 comprises a controlled contrarotating differentiating compound epicyclic reduction gearing. In this construction the motor shaft 94 drives an epicyclic primary reduction train in the following way. The shaft 94 is keyed to a spindle 95 carrying a sun gear 96 with which engage planet gears 97 carried on a planet carrier 98 which is keyed to a shaft 99. An annulus 100 has internal gear teeth and on its outer surface a brake band 101 engages with it to cause drive to be applied to the carrier, the brake band being operated as a main clutch by operating mechanism 102. The shaft 99 drives a sun gear 103 for a further epicyclic gear system and three planet wheels 104 are keyed to shafts 105, 106 and 107 (FIG. 14) which are mounted in roller bearings in cage members 108 and 109 rotating on bearings 110 and 111. The shafts 105, 106 and 107 carry further planet gears 112 engaging a further sun gear 113 which engages a braking wheel 114 by a squared stub 115 and a brake band 116 operates on a braking surface of the braking wheel 114, the brake band being operated by operating mechanism 117. The shafts 105, 106 and 107 also carry further planet wheels 118 driving a sun wheel 119 fixed to the cutter drive shaft 92 and a still further planet wheel 120 driving a clearing device driving sun wheel 121. The gear teeth ratios are selected so that when the brake mechanism 117 is operated to stop rotation of the brake wheel 114 the cutter and helix are put into predetermined opposite speeds of rotation and when the brake wheel 114 is free to rotate a differential action ensues so consequently, as with the construction described in FIG. 1 above, should the cutter be stopped the clearing device will double its speed and vice versa. It will be apparent that the controls 102 and 117 will be connected to hand-operated levers on the handle bar as with the above constructions.

The advantages of this construction are that it gives a smaller and therefore probably lighter construction which is coaxial and a very neat construction in which attitude of operation is irrelevant. It is safe since the differential prevents spinoff i.e. unexpected rotating movement of the handle bars. The construction gives a high speed on the clearing device for clearing vertical bores and the control brake, since it stops the braking wheel completely, does not waste power. Furthermore, the gear sizes may be selected so that all trains have fully hunting teeth thus distributing wear and resulting in longer availability of the machine. Furthermore there is only one small internally toothed gear which reduces cost. The device also offers the reduction in torque reaction similar to that available in the construction described above with reference FIGS. 1 to 4.

Figure 15:
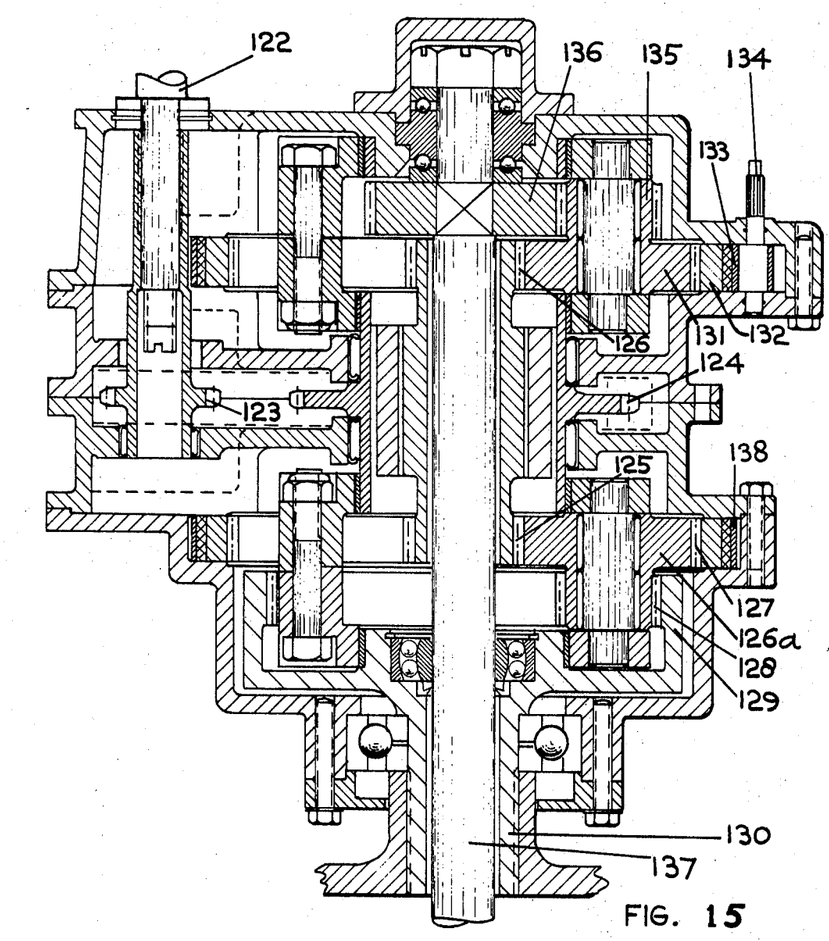
FIG. 15 is a section of the kinematic chain of a still further embodiment of the invention using epicyclic gearing and independent clutching by annulus braking.

In a still further construction shown in FIG. 15 an input shaft 122 is supplied from a motor suitable to the above description and drives a chain sprocket 123 which in turn drives a further chain sprocket 124 through a chain, not shown in the drawing. The chain wheel 124 carries gear teeth 125 and 126 on either side thereof. The teeth 125 form a sun wheel driving planet wheels 126a which engage with an internally geared brake wheel 127, the wheels 126a being mounted on a carrier and carrying further planet gears 128 which engage with a further annulus 129 the annulus 129 driving a clearing device drive 130. The annulus 127 is provided with a brake band brake 138 which is controlled in a similar way to the clutching brake band above described in connection with FIG. 13. In a similar way the teeth 126 are on a sun gear which drives planet gears 131 engaging with an annulus 132 braked by a brake band 133 controlled by brake control 134 and integral with the planets 131 are further planets 135 which engage with a sun wheel 136 which drives a shaft 137 which drives a cutter in the manner above described.

With this construction it will be seen that the clearing device and the cutter are driven independently of each other but independent control is given by operation of the brake bands 133 and 128 which enable either or both of the cutter and clearing device to be driven at the same time. The construction has some advantages and disadvantages; for example, all six compound planets are identical, both cages for the carrying of the planets are identical, the primary reduction is by chain and not epicyclic and therefore cheaper and the construction is simpler to assemble and service. However, there are three large internally toothed wheels which are expensive to produce. Also it is not possible to provide hunting teeth for the distribution of wear.

Figure 16:
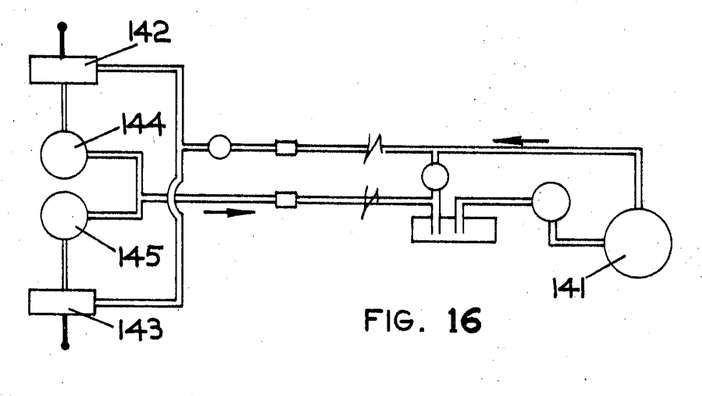
FIG. 16 is a flow diagram of a fluid drive.
Figure 17:
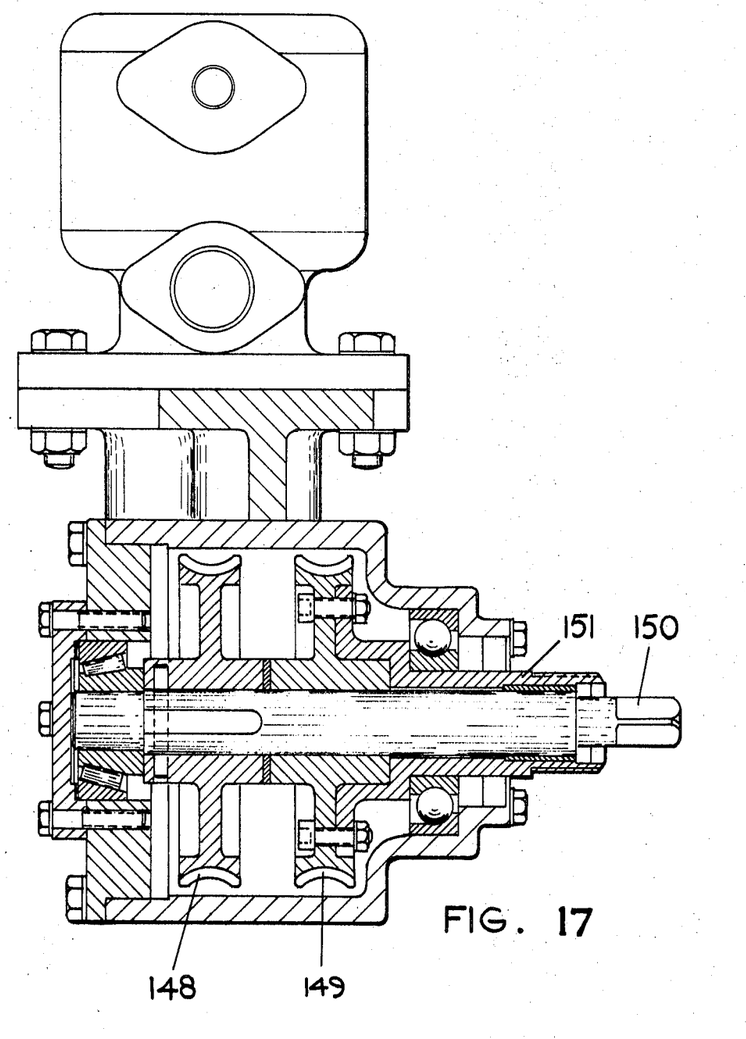
FIG. 17 is a part cross section of the fluid drive.
Figure 18:
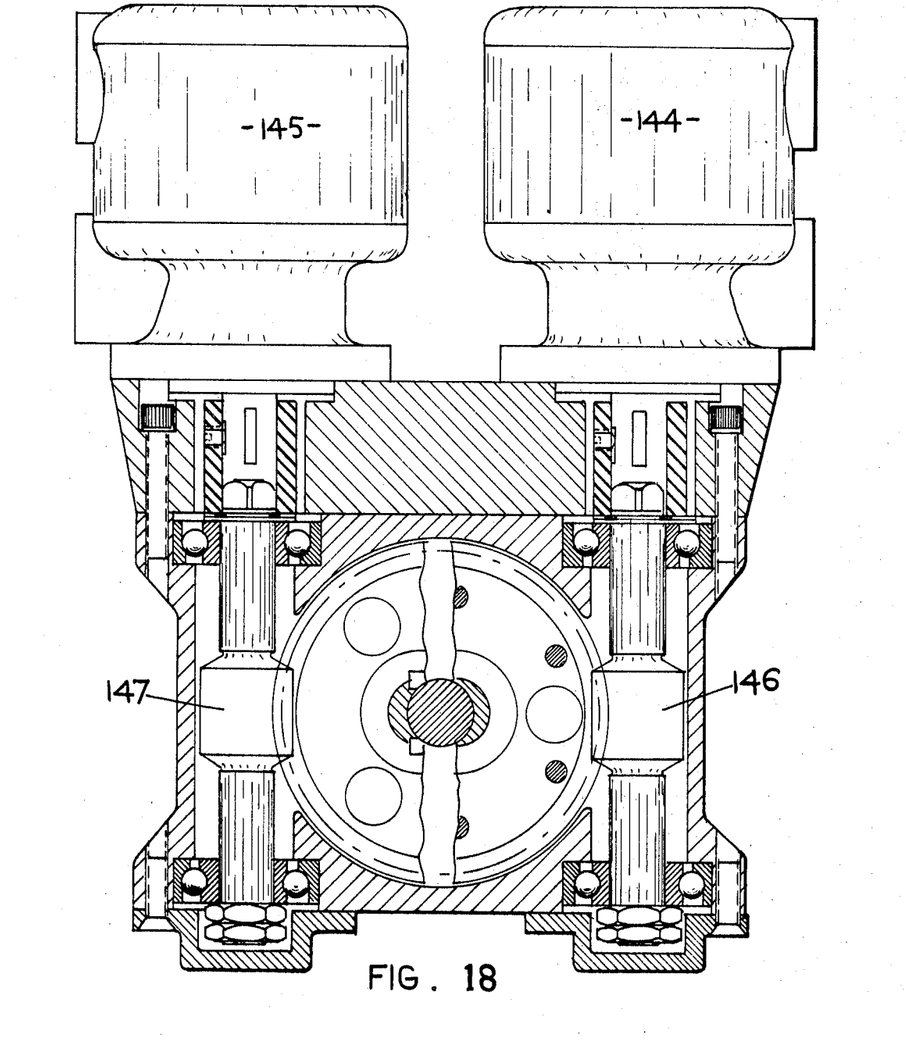
FIG. 18 is a part cross section of FIG. 17.

The above construction describes mechanical means of achieving the invention, however, as shown in FIGS. 16 to 18 other driving systems are possible for example a fluid circuit is shown in FIG. 16 in which a motor driven pump 141 or other source of high-pressure fluid is collected through a conduit and control valves 142 and 143 to two separate motors 144 and 145 respectively. These motors drive worms 146 and 147 which drive worm wheels 148 and 149 which in turn drive a cutter shaft 150 and a clearing device drive 151 in a similar manner to the construction shown in FIG. 1. In such a circuit, if the motor driven pump is started then by operating the control valves one or other or both of the motors 144 and 145 may be operated to drive the cutter and the clearing device substantially independently of each other except that with both motors working, as the speed of one falls or is lowered, more speed and power becomes available to the other so that there is a differentially self-regulating feature available similar to that obtainable using the construction shown in FIGS. 1 to 4, but with the added advantageous availability of controllable stepless speed variations without significant power wastage.

Electrical driving could be used using two series or compound motors with the series windings connected in series to give the same effect.

A differential action may also be given by providing a motor having a casing and a shaft each of which rotate in opposite directions and one drives the cutter and the other the clearing device. Electric hydraulic or pneumatic motors are suitable for this modification.

The foregoing constructions have the common feature of rotation of the cutter and the clearing device in opposite directions. Under the same circumstances controlled rotation in the same direction but at preferably different speeds may be desired. For example where rapid clearance of spoil is desired the driving is arranged the clearing device is driven faster than the cutter so that the effects of chip-breaking rapid clearance and freedom from corkscrewing are obtained. The driving mechanism to obtain this will be obvious from the foregoing clutch control being preferably provided the cutter and clearing devices are constructed as above described.

We claim:

1. Apparatus for boring holes comprising a frame, a rotatable cutter, a shaft mounting said cutter so as to be rotatable relative to said frame, a rotatable cuttings clearing device journaled on said shaft, a power source mounted on said frame, power transmission means connecting said power source to said cutter and to said clearing device so as to drive them in opposite direction, said power transmission means including an interlinking means interlinking the drives to said cutter and to said clearing device so that an increased torque reaction on one causes slowing up of that one and speeding up of the other, said cutter and said clearing device being constructed so that on a hole being made by the cutter the torque reaction of the cutter is substantially balanced by the torque reaction of the clearing device in clearing cuttings and in rubbing against the cylindrical wall of the hole so that under normal operating conditions little holding moment need be applied in holding the apparatus during boring.

2. Apparatus as claimed in claim 1 wherein manually operable controls are provided operation of which enables an operator to permit operation of said cutter and said clearing device at will.

3. Apparatus as claimed in claim 1 wherein said clearing device comprises a tube having a helical screw conveyor on the outer surface thereof, the outer diameter of the helix being substantially the same diameter as the diameter of the cutting circle covered by the cutter during rotation.

4. Apparatus as claimed in claim 3 wherein the length of said screw conveyor can be increased by the addition of further lengths of helix mounted on tube, said tube carrying a bearing in which shaft extensions to drive said cutter are rotatably mounted connecting means being provided between adjacent tubes and shafts.

5. Apparatus as claimed in claim 1 wherein said cutter comprises a base rotatably carrying a plurality of frustra of cones, the larger edges of which form the cutting edges.

6. Apparatus as claimed in claim 1 wherein said cutter comprises a base carrying a series of teeth pointing forwardly in the direction of rotation and raked towards the face to be cut.

7. Apparatus as claimed in claim 1 wherein said cutter comprises a plurality of radius blades having curved cutting edges.

8. Apparatus as claimed in any claim 1 having a pilot auger selected from a gimlet auger and a helical auger.

9. Apparatus as claimed in claim 1 wherein said power transmission means includes epicyclic gear trains.

10. Apparatus as claimed in claim 9 wherein said epicyclic gear trains are provided with two sets of brake bands and operating gear, manual operation of one which controls driving of the cutter and manual operation of the other of which controls driving of said clearing device.

11. Apparatus as claimed in claim 1 wherein said interlinking means comprises a differential gear.

12. Apparatus as claimed in claim 11 wherein two sets of brake means and operating gear are provided, one on a part of said transmission means driving said cutter and one on a part of said transmission means driving said clearing device, manual operation of which causing stopping of one and speeding up of the other.

13. Apparatus as claimed in claim 11 wherein the differential gearing may be deprived at will of the operator of its freedom to differentiate.

14. Apparatus as claimed in claim 1 wherein said power transmission means include a clutch means operable to disconnect said cutter from said source of power and a further clutch means operable to disconnect said clearing device from said source of power.

15. Apparatus as claimed in claim 1 wherein said power source comprises a source of fluid pressure and said power transmission means a pair of separate fluid-powered motors, one to drive said cutter and one to drive said clearing device conduits connecting said source of fluid pressure to said fluid-powered motors in parallel and control means operable by an operator to control the rotation of said cutter and of said clearing device.

16. Boring apparatus comprising a frame, a rotatable cutter, a shaft mounting said cutter so as to be rotatable relative to said frame, a rotatable screw conveyor journaled on said shaft, a power source mounted on said frame, power transmission means mounted on said frame connecting said power source to said rotatable cutter and to said rotatable screw conveyor so that the torque of the one is balanced through said power transmission means against the torque of the other so that when both said cutter and said conveyor are rotated in opposite directions said frame is substantially free of torque, and manually operable control means connected to said power transmission means and operable by an operator selectively to control rotation of said cutter and said conveyor so that either or both may rotate according to the selection made by the operator.